United States Patent [19]

Bentley

[11] 4,161,291
[45] Jul. 17, 1979

[54] EMITTER

[76] Inventor: Clarence Bentley, 9256 Stamps Ave., Downey, Calif. 90240

[21] Appl. No.: 956,805

[22] Filed: Nov. 1, 1978

[51] Int. Cl.² .............................................. B05B 15/00
[52] U.S. Cl. ...................................... 239/542; 239/570
[58] Field of Search ..................... 239/533.14, 570, 542

[56] References Cited

U.S. PATENT DOCUMENTS

| 3,998,427 | 12/1976 | Bentley | 239/542 X |
| 4,011,893 | 3/1977 | Bentley | 239/542 X |

*Primary Examiner*—Richard A. Schacher
*Attorney, Agent, or Firm*—Gordon L. Peterson

[57] ABSTRACT

An emitter for use in drip irrigation comprising an emitter body defining an emitter chamber and a resilient element having first and second opposite faces mounted in the emitter chamber with the first face confronting a surface of the emitter chamber. The surface of the emitter chamber and the first face cooperate to define a restricted fluid passage. The emitter body has an inlet for supplying fluid under pressure to the emitter chamber and an outlet leading from the fluid passage. The resilient element has an aperture providing communication between the second face of the resilient element and the fluid passage so that fluid can pass from the inlet through the aperture and the fluid passage to the outlet. The pressure drop across the aperture is increased to hold the first face of the resilient element against the surface of the emitter chamber to maintain the integrity of the fluid passage. This may be accomplished, for example, by utilizing one or more slits for the aperture or by providing a suitable valve member in the aperture.

10 Claims, 15 Drawing Figures

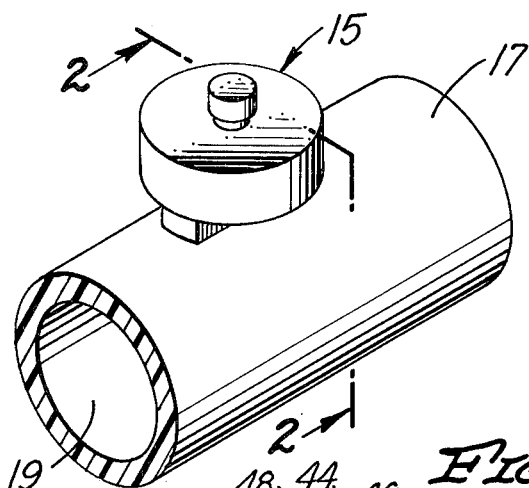
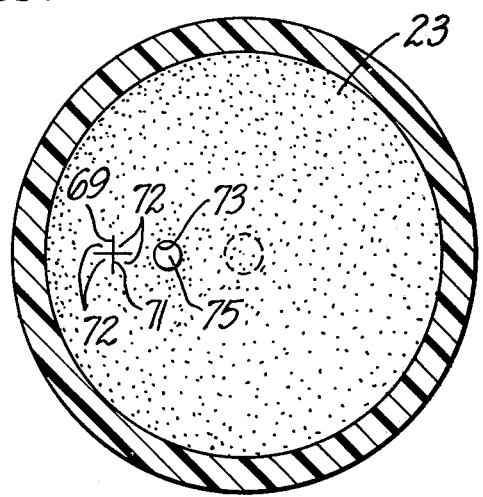
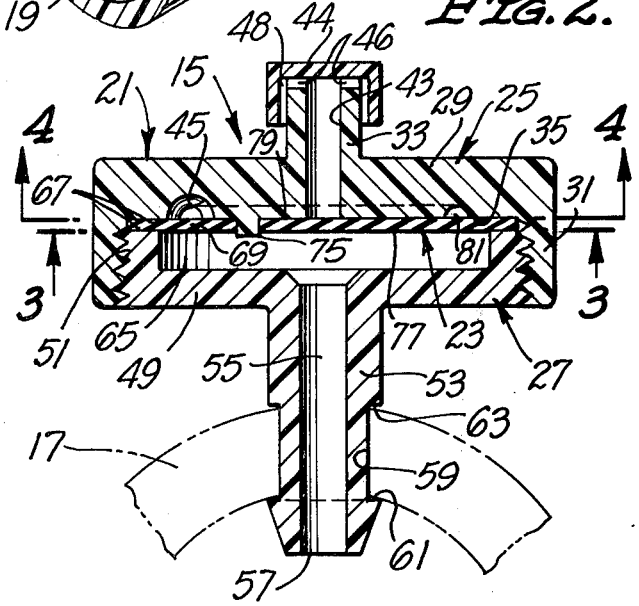
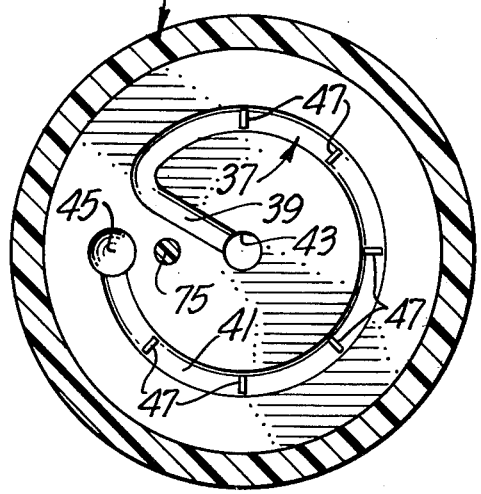
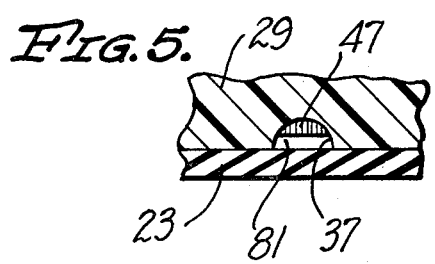
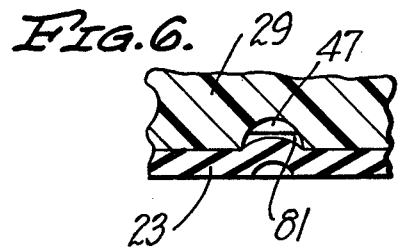

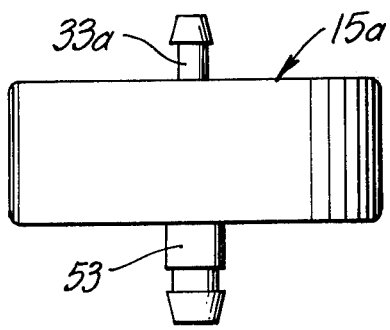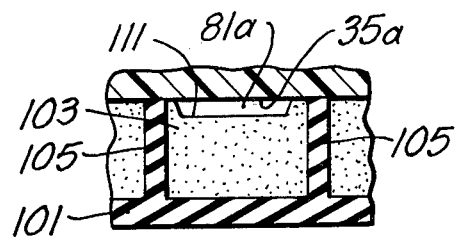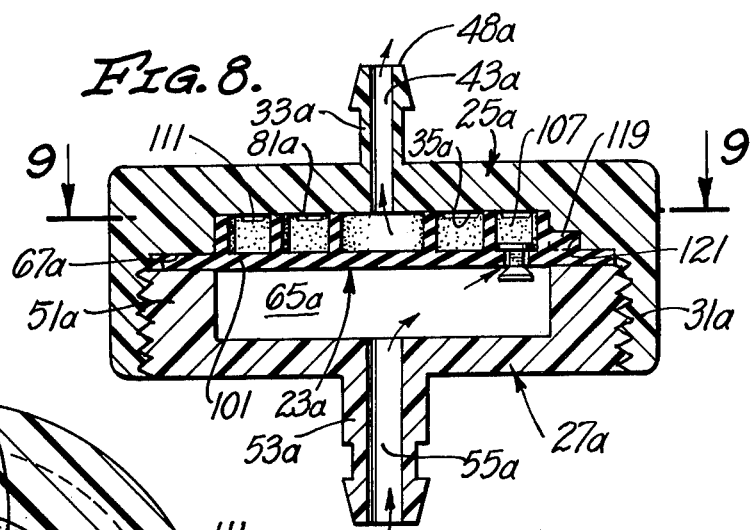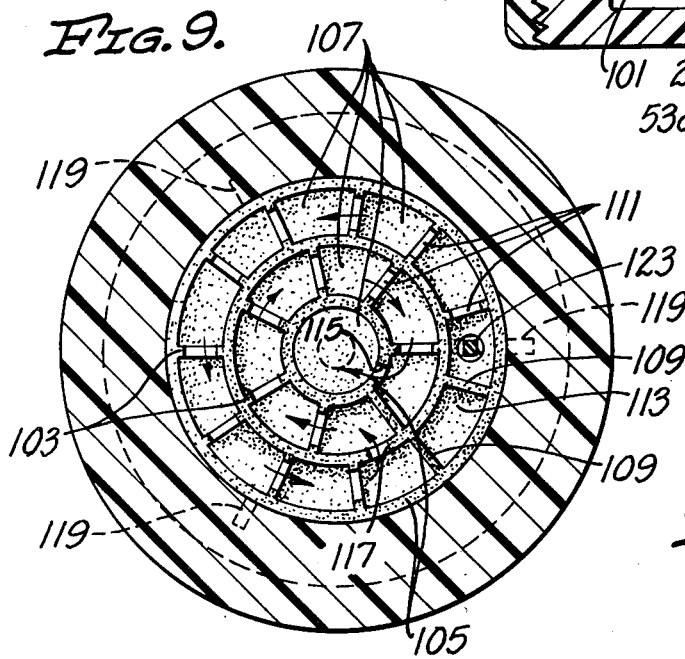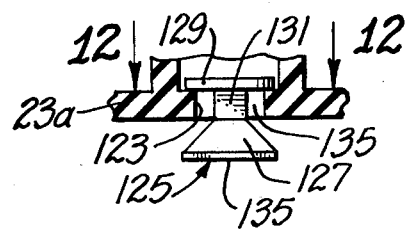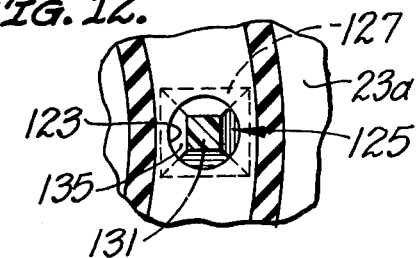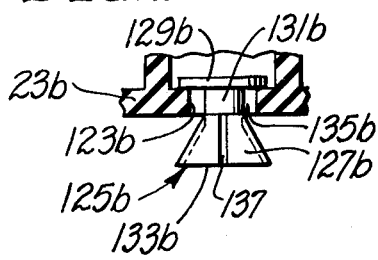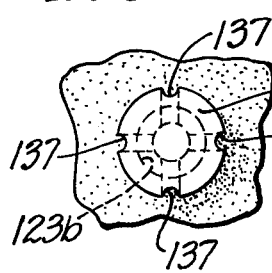

EMITTER

BACKGROUND OF THE INVENTION

My prior U.S. Pat. No. 4,011,893 discloses an emitter, or drip irrigation valve, in which the pressure drop across the emitter is obtained by a restricted fluid passage defined by a groove in one surface of the emitter and a resilient element which is contiguous that surface of the emitter. Water flows from an inlet through an aperture in the resilient element and through the restricted fluid passage to an outlet. The pressure drop in the restricted fluid passage is sufficient to provide for the discharge of water at the outlet at a slow trickle or drip rate.

My prior U.S. Pat. No. 3,998,427 discloses a similar drip irrigation emitter, except that the resilient element is in the form of a grid. The grid cooperates with a surface of the emitter to define the restricted fluid passage.

Although these emitters are very satisfactory, it has been found that, on occasion, water leaks out of the restricted fluid passage and gets between the resilient element and the emitter surface to such an extent that the restricted fluid passage is enlarged. This increases substantially the discharge rate of the emitter.

SUMMARY OF THE INVENTION

Through strudy and evaluation, I discovered the cause for the problem noted above. At higher flow rates through the emitter, the pressure drop across the aperture is sufficient to hold the resilient element tightly against the emitter surface to prevent leakage of water out of the restricted fluid passage. However, at lower flow rates, the pressure drop across the aperture is reduced sufficiently so that, in some cases, water can leak out of the restricted fluid passage and get between the resilient element and the emitter surface.

To overcome this problem, this invention provides for increasing the pressure drop across the aperture in the resilient element. Although this could be accomplished by simply reducing the area of the aperture, a small orifice is subject to clogging and, for this reason, this invention provides means on the resilient element at the aperture means for increasing the pressure drop across the resilient element while minimizing the danger of clogging. The pressure drop is increased sufficiently so that the resilient element is urged against the emitter surface to maintain the integrity of the restricted fluid passage even at relatively low flow rates through the aperture.

Although the pressure drop across the aperture can be increased in different ways, in one form of the invention, the pressure drop is increased by constructing the aperture in the form of at least one slit. The slit may define at least one flap in the resilient element, and the surface of the emitter can advantageously have a well adjacent the slit to permit the flap to flex into the well to open the slit sufficiently to allow adequate water flow therethrough. This also allows the slit to pass particulate matter, and for this reason, clogging of the slit is unlikely.

Alternatively, the pressure drop can be increased by providing a valve element in the aperture of the resilient element. Preferably, the valve element is movable in the aperture, and the aperture and the valve element cooperate to define passage means between the second face of the resilient element and the restricted fluid passage formed by the emitter surface and the opposite face of the resilient element. The valve element can advantageously be movable between first and second positions. In one embodiment, the effective area of the portion of the passage means formed by a head of the valve element and the aperture is less in the first position than in the second position. The valve element is moved to the first position during normal operation of the emitter so that there is a substantial pressure drop across the resilient element as a result of the relatively small effective cross-sectional area of the passage. On the other hand, when the emitter is not being used, the valve element moves, or can be easily moved, to the second position to increase the effective cross-sectional area of the passage means at the head so that any foreign or particulate matter which may have been lodged in the passage means at the head can be readily removed. Alternatively, the head can completely close the passage means in the second position.

Movement of the valve element to the first position can be accomplished, for example, by providing a pressure responsive face on the valve element. This enables the fluid under pressure from the inlet to move the valve element to the first position. The passage means can be defined by appropriately sizing and configuring the peripheries of the aperture and the valve element.

The invention can best be understood by reference to the following description taken in connection with the accompanying illustrative drawing.

BRIEF DESCRIPTION OF THE DRAWING

FIG. 1 is an isometric view of an emitter constructed in accordance with the teachings of this invention installed on an irrigation tube.

FIG. 2 is an enlarged sectional view taken generally along line 2—2 of FIG. 1.

FIG. 3 is an enlarged sectional view taken generally along line 3—3 of FIG. 2.

FIG. 4 is an enlarged sectional view taken generally along line 4—4 of FIG. 2.

FIG. 5 is an enlarged fragmentary sectional view through the restricted fluid passage adjacent one of the dams in the restricted fluid passage when there is no flow through the emitter.

FIG. 6 is a view similar to FIG. 5 illustrating how the resilient element is forced into the groove to reduce the cross-sectional area of the groove to make the emitter pressure compensating.

FIG. 7 is a side elevational view of another form of emitter constructed in accordance with the teachings of this invention.

FIG. 8 is a sectional view taken on an axial plane through the emitter of FIG. 7.

FIG. 9 is a sectional view taken generally along line 9—9 of FIG. 8.

FIG. 10 is an enlarged fragmentary sectional view of a portion of the resilient element and the restricted fluid passage.

FIG. 11 is a fragmentary view illustrating one form of valve element and its association with the aperture of the resilient element.

FIG. 12 is a fragmentary sectional view taken generally along line 12—12 of FIG. 11.

FIG. 13 is a view similar to FIG. 11 showing an alternate form of valve element.

FIG. 14 is a top plan view of the construction shown in FIG. 13.

FIG. 15 is a view similar to FIG. 11 illustrating another way of utilizing a valve element.

DESCRIPTION OF THE PREFERRED EMBODIMENTS

FIGS. 1 and 2 show an emitter 15 mounted on an irrigation tube 17 which may be of the type commonly used in drip irrigation systems. The tube 17 has a central passage 19 through which water under pressure can be supplied to the emitter 15.

The emitter 15 bears some resemblance to the flow control valve shown in my prior U.S. Pat. No. 4,011,893, except that the emitter 15 cannot be used to manually adjust the flow rate through the emitter. Generally, the emitter 15 includes an emitter body 21 and a resilient element 23. Although the emitter body 21 may be of different constructions, in the embodiment illustrated, it includes body sections 25 and 27, each of which can be integrally constructed of a suitable rigid plastic material. The body section 25 has an end or transverse wall 29, an annular internally threaded skirt 31, and a centrally located outlet tube 33.

The body section 25 has a flat interior emitter face 35 in which a groove 37 (FIG. 4) is formed. Although the groove 37 may be of various configurations, in the embodiment illustrated, it includes a radial leg 39 and a part circular leg 41. The radial leg 39 extends from a centrally located axial outlet passage 43 (FIGS. 2 and 4) radially outwardly to one end of the part circular leg 41. The part circular leg 41 can be of varying lengths, but in the embodiment illustrated, it extends for just under 360 degrees and terminates at its other end in a hemispherical well or depression 45. To increase the restriction to flow in the groove 37, a plurality of walls or dams 47 are equally spaced along the length of the part circular leg 41. As shown in FIG. 5, the dams 47 do not extend for the full depth of the groove 37. The dams 47 are optional and can be eliminated, if desired.

The tube 33 may be covered by the usual outlet cap 44 with radial slots 46 providing communication between the outlet passage 43 and an outlet 48 of the emitter 15.

The body section 27 includes an end or transverse wall 49, an annular externally threaded skirt 51 and a centrally located inlet tube 53. An inlet passage 55 extends axially through the inlet tube 53 and opens at an inlet 57 remote from the end wall 49. The inlet tube 53 is adapted to project through an opening 59 (FIG. 2) in the tube 17 to provide communication between the interior of the tube 17 and the inlet 57. An annular groove defines shoulders 61 and 63 for retaining the inlet tube 53 on the tube 17 to thereby mount the emitter on the tube 17.

The skirt 51 is threaded into the skirt 31 to attach the body sections 25 and 27. When so attached, the body sections 25 and 27 cooperate to define an emitter chamber 65 with the emitter surface 35 forming one surface of the emitter chamber.

The resilient element 23 may be constructed of rubber or other resilient flexible material. A peripheral region of the resilient element 23 is clamped between shoulders or clamping portions 67 of the body sections 25 and 27. Thus, the resilient element 23 forms a seal between the body sections 25 and 27.

The resilient element 23 has an aperture which in this form of the invention is defined by two short perpendicular slits 69 and 71 which intersect to form a cross. The slits 69 and 71 define four flaps 72 which are located at the open end of the well 45. To properly index the resilient element 23 and the body section 25, the resilient element has a hole 73 (FIG. 3) sized and positioned to receive a lug 75 which projects from the emitter surface 35 of the body section 25.

The resilient element 23 has opposite faces 77 and 79. The face 77 is exposed in the emitter chamber 65, and the face 79 confronts and is contiguous the emitter surface 35. The resilient element 23 closes the open face of the groove 37 so that a restricted fluid passage 81 (FIGS. 2, 5 and 6) is defined between the resilient element and the emitter surface 35. The restricted fluid passage 81 extends from the well 45 to the outlet passage 43, and its effective cross-sectional area is reduced at several locations along its length by the dams 47.

With the emitter 15 installed on the irrigation tube 17, water can flow from the passage 19 of the irrigation tube through the inlet 57, the inlet passage 55, the emitter chamber 65, the slits 69 and 71, the restricted fluid passage 81, the outlet passage 43 to the outlet 48. The length and effective cross-sectional area of the restricted fluid passage 81 create a substantial pressure drop in the water passing therethough. This pressure drop is sufficient so that water is discharged from the outlet 48 at a slow trickle or drip rate. Specifically, the water at relatively high pressure in the emitter chamber 65 forces the flaps 72 defined by the slits 69 and 71 upwardly as viewed in FIG. 2 into the well 45 to provide an opening for the passage of water into the restricted fluid passage 81. However, the effective cross-sectional area of the opening is sufficiently small so that an adequate pressure drop across the resilient element 23 is maintained. Specifically, the flaps 12 move into the well 45 or open a variable amount depending on the pressures on the opposite sides of the resilient element 23. The pressure drop is sufficient to hold the resilient element 23 against the surface 35 so that water cannot leak out of the restricted fluid passage 81 and get between other portions of the surface 35 and the resilient element.

The emitter 15 may have a pressure compensating feature. As water inlet pressure in the emitter chamber 65 increases, the pressure drop across the slits 69 and 71 increases. This increased pressure differential across the resilient element 23 deforms the resilient element into the groove 37 as shown in FIG. 6. This reduces the effective cross-sectional area of the restricted fluid passage 81 as shown in FIG. 6. The amount of the restriction increases as the water pressure in the emitter chamber 65 increases, and conversely, the restriction decreases with a decrease in such pressure. The resilience of the resilient element 23 can be selected to obtain the desired relationship between the amount of the restriction and the pressure in the emitter chamber 65. For drip irrigation systems, it is preferred to increase the restriction to flow in the restricted fluid passage 81 so that the flow rate through the emitter 15 is substantially immune to pressure changes in the emitter chamber.

FIGS. 7–12 show an emitter 15a which bears some resemblance to the flow control valve shown in my prior U.S. Pat. No. 3,998,427. Portions of the emitter 15a corresponding to portions of the emitter 15 are designated by corresponding reference numerals followed by the letter "a." The emitter 15a is identical to the emitter 15 in all ways not shown and described herein.

The body section 25a is quite similar to the body section 25. However, the body section 25a does not have the groove 37, the well 45 or the lug 75 so that the emitter surface 35a thereof is flat and planar. In addition, the outlet tube 33a is of slightly different configuration, and the cap 44 has been eliminated from the emitter 15a. Except for dimensional variations, the body section 27a is identical to the body section 27. When assembled, the body sections 25a and 27a form an emitter chamber 65a which has a larger axial dimension than the emitter chamber 65.

The primary difference between the emitters 15 and 15a is that the resilient element 23a is in the form of a grid and may be identical to the grid shown in my prior U.S. Pat. No. 3,998,427. Briefly, the resilient element 23a includes an end or transverse wall 101, radial grid walls 103 (FIG. 9) and circumferential grid walls 105 with the grid walls cooperating to define a plurality of open-ended pockets 107. The walls 103 and 105 may be provided in different configurations, and the configuration shown in FIG. 9 is purely illustrative. In the embodiment illustrated, the circumferential grid walls 105 are annular and concentric and define three rings with one set of the radial grid walls 103 extending between the innermost and central circumferential grid walls and another group of radial grid walls extending between the central and outer circumferential grid walls. Except for two radial grid walls 109, each of the radial grid walls 103 has a notch 111 (FIGS. 8-10) in the upper end thereof.

The two unnotched radial grid walls 109 define a closed pocket 113. The center pocket 107 which is defined by the innermost circumferential grid wall 105 opens into the outlet passage 43a, and a notch 115 in the innermost circumferential grid wall 105 provides communication between the central pocket and the adjacent ring of pockets. Similarly, a notch 117 in the central circumferential grid wall provides communication between the two adjacent rings of pockets.

To orient the resilient element 23a in the emitter chamber 65a, the resilient element has a plurality (3 being illustrated) of lugs 119, and the body section 25a has a corresponding number of similarly spaced recesses 121. The lugs 19 are received in the recesses 121 to orient the resilient element.

The resilient element 23a is held against the emitter surface to define therewith a restricted fluid passage 81a. The primary restriction to liquid flow through the passage 81a is provided by the notches 111, 115 and 117.

An aperture 123 is provided in the end wall 101 to provide communication between a portion of the emitter chamber 65a and the outer row of pockets 107.

A valve element 125 (FIGS. 8, 11 and 12) is mounted for movement in the aperture 123 for increasing the pressure drop across the aperture. As best shown in FIGS. 11 and 12, the valve element 125 includes an enlarged tapered head 127, a flange 129 and a relatively thin shank 131 for joining the head to the flange. In the embodiment illustrated, the aperture 123 is circular in plan (FIG. 12) and the head 127 is generally in the configuration of a truncated pyramid having four sloping side walls. The head 127 has a pressure responsive face 133 which is exposed to the fluid pressure within the emitter chamber 65a.

Because of the difference in cross-sectional configurations, there is a space between the valve element 125 and the rim of the aperture 123 which defines passage means 135. The valve element 125 is movable between a restricted flow position in which the head 127 is in contact with the resilient element 23a and a second position shown in FIGS. 11 and 12 in which the head 127 is moved away from the resilient element 23a so that the flange 129 rests on the resilient element 23a. Because the head 127 is square in cross section and the aperture 123 is circular, the passage means 135 cannot be closed off by the head regardless of the position of the valve element 125 in the aperture 123. However, the effective cross-sectional area of the passage means 135 is significantly reduced when the valve element 125 is in the restricted flow position in which the head 127 engages the resilient element 23a.

In use, fluid flows from the inlet passage 55a into the emitter chamber 65a, through the passage means 135, the restricted fluid passage 81a and the outlet passage 43a to the outlet 48a. Fluid pressure in the emitter chamber 65a acting on the pressure responsive face 133 forces the valve element to the restricted position in which the head 127 engages the resilient element 23 to thereby reduce the effective cross-sectional area of the passage means 135 to a minimum. Because of the small effective cross-sectional area of the passage means 135, there is a significant pressure drop across the resilient element 23a even at low flow rates. Accordingly, the resilient element 23a is forced by this differential pressure tightly against the emitter surface 35a to maintain the integrity of the restricted fluid passage 81a. If any particulate matter is trapped between the head 127 and the resilient element 23a, it is automatically freed when the valve element 125 returns to the low-pressure position shown in FIG. 11 as a result of the enlarging of the space between the head 127 and the rim of the aperture 123.

FIGS. 13 and 14 show a valve element 125b of alternate construction. Portions of the embodiment of FIGS. 13 and 14 corresponding to portions of the embodiment of FIGS. 11 and 12 are designated by corresponding reference numerals followed by the letter "b."

The primary difference between the valve elements 125b and 125 is that the head 127 is frustoconical and has four equally spaced grooves 137 extending along the surface of the head. The grooves 137 prevent the passage means 135 from being closed off by the head 127b even in the restricted flow position of the valve element 125b. The valve element 125b operates in the same manner as described above for the valve element 125.

FIG. 15 shows a construction which is identical to the construction shown in FIG. 11, except that the position of the valve element 125c is reversed, a light spring 151 is interposed between the resilient element 23c and the flange 129c and the head 127c is conical so that it can seat on the rim of, and fully close, the aperture 123c. Portions of the construction shown in FIG. 15 corresponding to portions of the construction shown in FIG. 11 are designated by corresponding reference numerals followed by the letter "c." The spring 151 resiliently urges the valve element 125c toward the closed position in which the aperture 123 is fully closed by the head 127c. When fluid flows through the aperture 123c, the fluid pressure acting on the valve element 125c overcomes the biassing action of the spring 151 to move the valve element upwardly as viewed in FIG. 15 to thereby open the aperture 123c. One advantage of this construction is that the spring closes the aperture 123c in the absence of fluid flow regardless of the spatial orientation of the emitter 15.

Although exemplary embodiments of the invention have been shown and described, many changes, modifications and substitutions may be made by one having ordinary skill in the art without necessarily departing from the spirit and scope of this invention.

I claim:

1. An emitter for use in drip irrigation comprising:
   body means for defining an emitter chamber, said body means including a first surface defining at least a portion of said emitter chamber;
   a resilient element having first and second opposite faces;
   means for mounting the resilient element in said emitter chamber with said first face confronting and closely adjacent said first surface;
   said first surface and said first face cooperating to define a restricted fluid passage;
   said body means including an inlet for supplying fluid under pressure to the emitter chamber and the second face of the resilient element;
   said resilient element having aperture means providing communication between said second face of said resilient element and said restricted fluid passage;
   said body means including an outlet leading from said restricted fluid passage whereby fluid under pressure can pass from the inlet through said aperture means and said restricted fluid passage to said outlet; and
   means on said resilient element at said aperture means for increasing the pressure drop across said resilient element whereby the pressure drop urges the resilient element against the first surface to maintain the integrity of the restricted fluid passage even at relatively low flow rates through the aperture means.

2. An emitter as defined in claim 1 wherein said last-mentioned means includes said aperture means being in the form of at least one slit.

3. An emitter as defined in claim 2 wherein said slit forms at least one flap in said resilient element and said first surface has a well adjacent the slit to permit the flap to flex into the well.

4. An emitter as defined in claim 1 wherein said last-mentioned means includes a valve element mounted in said aperture means of said resilient element.

5. An emitter as defined in claim 4 wherein said valve element is movable in said aperture means and said valve element and said aperture means cooperate to define passage means between said second face and said restricted fluid passage.

6. An emitter as defined in claim 4 wherein said valve element has a pressure responsive face exposable to the fluid under pressure in the valve chamber which acts on the second face of the resilient element whereby such fluid under pressure can urge the valve element to a first position, said valve element having a head which cooperates with said aperture means to define at least a portion of passage means which extend between the second face of the resilient element and said restricted fluid passage in said first position of said valve element, and said valve element being movable to a second position when the pressure in the valve chamber which acts on the second face of the resilient element is reduced, said portion of said passage means from the second face of the resilient element to said restricted fluid passage being enlarged in said second position of said valve element whereby said passage means can be more readily cleaned.

7. An emitter as defined in claim 1 wherein said first surface has a groove therein, said groove and said resilient element cooperating to define said restricted fluid passage.

8. An emitter as defined in claim 1 wherein said resilient element includes a grid having a plurality of grid walls defining a plurality of pockets opening toward said first surface, said grid walls and said first surface cooperating to at least partially define said restricted fluid passage.

9. An emitter as defined in claim 1 wherein said body means includes first and second body members joined together, a peripheral region of said resilient element being clamped between said first and second body members to mount said resilient element in said valve chamber.

10. An emitter as defined in claim 5 wherein said valve element is movable in said aperture means between first and second positions with the cross-sectional area of said passage means being less in said first position than in said second position and including spring means for urging said valve element toward said first position.

* * * * *